April 9, 1968
J. R. BASKETT
3,377,605
MINIATURE POTENTIOMETER
Filed April 6, 1967
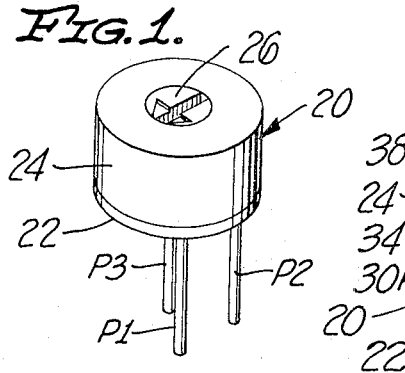
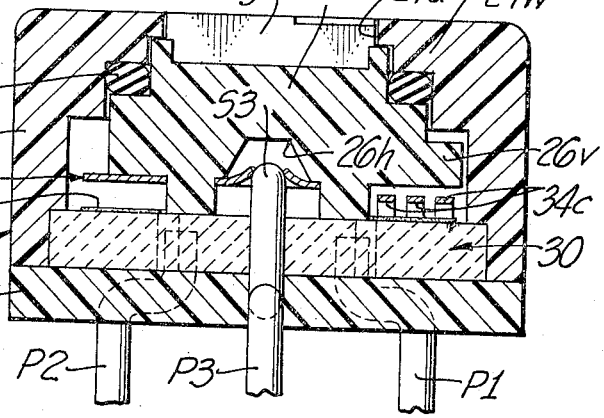
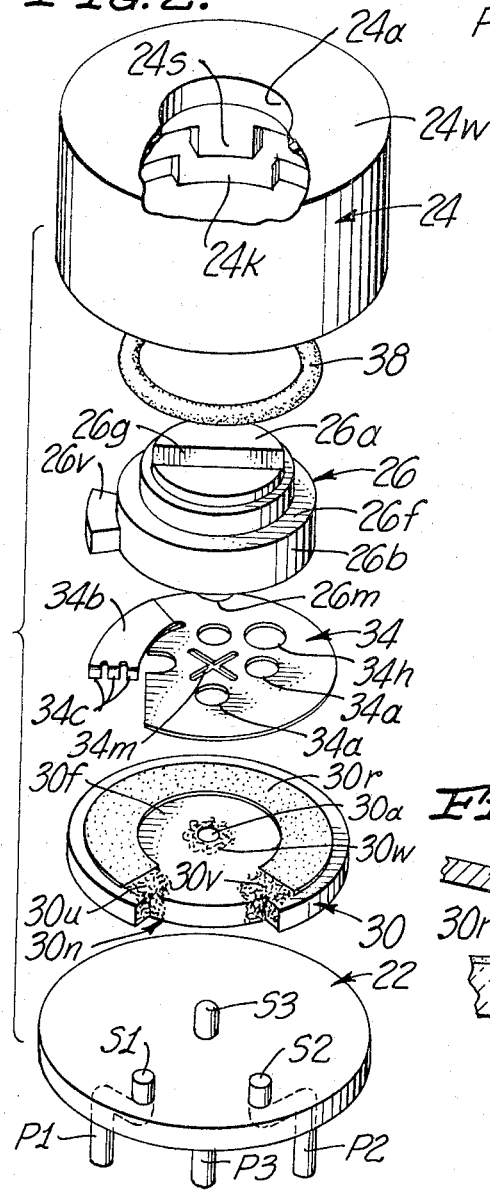
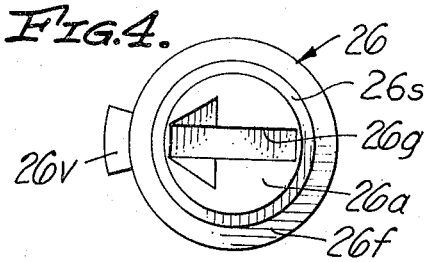
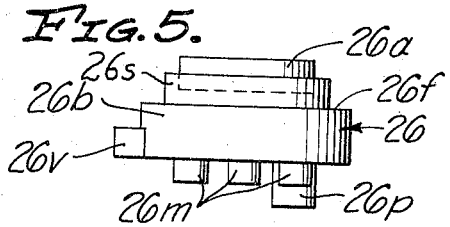
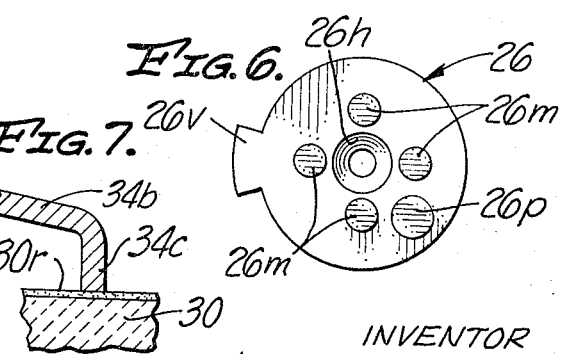
INVENTOR
JOHN R. BASKETT
BY

UNITED STATES PATENT OFFICE 3,377,605
Patented Apr. 9, 1968

3,377,605
MINIATURE POTENTIOMETER
John R. Baskett, Riverside, Calif., assignor to Bourns, Inc., a corporation of California
Filed Apr. 6, 1967, Ser. No. 628,889
11 Claims. (Cl. 338—162)

ABSTRACT OF THE DISCLOSURE

A very small single-turn rotary potentiometer characterized by improved constancy of contact resistance resulting from constant contact cross-section during wear, freedom from lack of uniformity of contact-element force and pressure from instrument to instrument which lack of uniformity is characteristic of prior art potentiometers because of additive or subtractive tolerances of parts dimensions which result in marked variations of spacing of contact base from element surface, the potentiometer having means for maintaining uniform the separation distance between the contact base and the resistance element surface from instrument to instrument with only a single dimensional tolerance involved, the distance being determined by the fixed length of spacers arranged and held in contact with the element base and the contact base, and wear of contact being compensated by concurrent wear of other surfaces including those of the spacers.

In the prior art single-turn rotary potentiometers the distance between the resistance element and the rotary base supporting the resilient contact arm was subject to wide variation, due to dimensional variation of manufactured components within specified dimension tolerances or variation limits, and to the fact that the noted distance was determined by several dimensions of several parts, whereby if all of the dimensions of the parts of concern in a particular potentiometer were at or near the upper tolerance limit the distance of separation may be considerably smaller than average, whereas if all of the parts of concern were at or near the lower tolerance limit the distance may be considerably greater than average. As is well known, parts of machines are generally manufactured so as to conform or fall within pre-established dimensional tolerance limits above and below a desired ideal dimension, and that the looser or wider the tolerance limits the less expensive the parts, and vice versa. Thus the specified limits or specifications for dimensional tolerances are generally made as wide as is feasible, whereby the cost of manufacturing the part is reduced as much as is reasonably possible. That is especially true in the case of devices which comprise numerous parts and more particularly in the latter case when very large numbers of the devices are used and wherein there is as a consequence an exceptional desire to keep the unit cost of the devices at a minimum. Thus in the case of very small single-turn rotary potentiometers which are used in very large numbers on electronic circuit boards, the foregoing considerations apply to an exceptional degree.

The difficulty arises, however, that in such very small potentiometers the force and pressure with which the movable wiper or contact engages the surface of the resistance element must be relatively large (which tends to cause considerable wearing of the contact surface) and that contact-resistance must be kept low but due to smallness of the parts varies considerably as the above-noted distance changes. Changes of contact-resistance are desirably as low as it is feasible to attain. Accordingly it is desirable to maintain the contact spring tension (contact force) uniform and at a determined optimum value, and to maintain the effective area of surface engagement between the element and the contact constant so the contact pressure will remain constant. As is evident, as the distance separating the element from the base of the contact arm varies, the spring tension of the contact arm varies, and with it, the contact force. Also evident is the fact that unless the contact extends perpendicularly from the surface of the element and is of constant cross-section throughout the length subject to wearing, the area of contact surface in engagement with the element increases as the contact wears.

Further, if parts tolerances are permitted to build up, that is, if the distance separating the contact body from the element is governed by dimensions of very many parts, gross variations of contact force can result due to gross differences in accumulated tolerances which result in differing contact-arm compressions.

According to the invention, the noted defects or deficiencies of prior art potentiometers of the class mentioned are overcome, in part by provision of means which maintains the contact force uniform within a large lot or group of like potentiometers assembled from parts which may have relatively loose manufacturing dimensional tolerances, and in part by so disposing and shaping the contact structure that the active surface of the contact remains constant during the life of the contact, and by so arranging parts that contact wear is compensated to some extent by wear of other members.

Thus it is an important object of the invention to provide general improvements in very small single-turn potentiometers. By very small is meant of the order of one-fourth inch or less in outside diameter.

Another object of the invention is to provide means for improving performance of very small single-turn potentiometers while concurrently lowering the cost of manufacture thereof.

Another object of the invention is to provide means for maintaining the contact force and contact area uniform in a single-turn rotary potentiometer during wearing of the contact during the lifetime thereof.

Other objects and advantages of the invention are hereinafter set out and made evident in the appended claims and following description of a preferred exemplary embodiment of the invention as illustrated in the accompanying drawings forming a part of this specification.

In the drawings:

FIGURE 1 is a pictorial view of the exemplary potentiometer, to a grossly enlarged arbitrary scale;

FIGURE 2 is an "exploded" pictorial view showing the principal components of the exemplary potentiometer in disassembled array, to a further enlarged arbitrary scale;

FIGURE 3 is a transverse sectional view illustrating certain features of the construction and assembly of the potentiometer, the scale being larger than that of FIGURE 2 for the sake of better showing details;

FIGURES 4, 5 and 6 are top, elevation and bottom views of a driving member of a rotor device comprised in the potentiometer; and FIGURE 7 is a fragmentary sectional detail view of a contact arrangement.

The illustrated potentiometer, which in a presently manufactured form is of the order of less than one-fourth inch outside diameter and of the order of less than three-sixteenths inch high exclusive of protruding terminal pins, is denoted generally by the number 20 (FIGURE 1). It comprises a housing composed principally of a disc-like base 22 and a shell-like cover or cap 24. As indicated in FIGURE 2, cap 24 is of generally cylindrical exterior form with a top wall 24w which is provided with a generally circular aperture 24a centrally located in the top wall. The aperture is dimensioned to receive a cylindrical upper end portion of a driving member 26 of a rotor device hereinafter described. As is indicated in FIGURE 1, terminal pins P1, P2 and P3 extend downwardly from the bottom of the housing.

Base 22 (FIGURE 2) is a disc of molded insulation such as diallyl phthalate, and has molded therein, between the upper and lower faces thereof, intermediate anchoring offset portions of the noted terminal pins, thus leaving relatively long spaced-apart portions of the terminal members depending from the bottom of the base and dimensionally spaced for entry into complementary apertures in electronic circuit cards or boards. Shorter upper end portions of the terminal pins protrude to form respective stubs S1, S2 and S3 the former two of which are electrically connected to a resistance element and the latter of which serves the dual function of a pivot for the rotor device and an electrical connector to the movable contact device of the rotor device.

Secured to the upper face of base 22 as by adhesive means, and closely encircled by the lower skirt of cap 24, is a ceramic member or substrate 30 (FIGURES 2 and 3) which preferably is of steatite or alumina. The substrate is of molded insulation and of wafer form, with a notch 30n and a central aperture 30a formed therein, and is provided with adherent electrically conductive films or coatings 30u and 30v over respective face areas adjacent ends of the notch and extending down into respective corner faces of the notch, and optionally, also a similar conductive coating 30w adjacent and/or within the borelike aperture 30a. The conductive coatings, which may be of silver applied as a paint and fired, are adapted to be soldered or brazed to respective ones of terminal pin stubs S1, S2 and S3 to provide secure electrical connections. The notch 30n is so dimensioned relative to the distance between stubs S1 and S2 that the latter fit closely against respective ones of the films or coatings 30u and 30v in the corners of the notch. Disposed around an arcuate portion of the upper face of substrate 30 and overlying at its ends respective ones of coatings 30u and 30v is a resistance element 30r which is adherent to the substrate and the coatings 30u and 30v and thus is electrically connected at its ends with respective terminal pins P1 and P2. The element 30r may be of a resistive film-forming material such as carbonaceous composition, cermet, or deposited metal or carbon; and is by the nature of the substrate insulated from coating 30w and stub S3.

Disposed for rotation in the housing of the potentiometer and restricted to rotation about an axis generally coincident with that of the potentiometer by the periphery of aperture 24a of the cover 24 and by the stub S3 of terminal P3 acting as bearings, is a rotor device comprising the noted driving member 26 (hereinafter termed a driver) and a shaped resilient conductive contact device 34 (FIGURE 2) which is stamped from sheet material and which is affixed to the driver for rotation therewith. The driver 26 has an upper transversely slotted portion 26a adapted for close rotational fit in cover aperture 24a, and integral therewith a larger body portion 26b which has an upper annular face 26f. An O-ring 38 (FIGURES 2 and 3) fits around the upper circular portion of the driver and is interposed under some compressive stress between annular face 26f and the upper interior annular surface or ceiling of cover 24 encircling aperture 24a, thereby providing a rotary seal around the aperture.

Secured to the bottom face of driver 26 is the noted contact device 34 (FIGURE 2). Attachment is effected by a large protuberance 26p (FIGURES 5 and 6) provided on the bottom of the driver and which extends through a complementary hole 34h (FIGURE 2) formed in the body of the contact device and is peened over as by application of heat and pressure to hold the body of the contact device in face-to-face contact with the driver. Further the contact device is integrated with the driver by a plurality of legs such as 26m (FIGURES 5 and 6) formed on the bottom of the driver and each of which extends through a respective one of complementary apertures or cut-outs such as 34a (FIGURE 2) formed in the body of the contact device. Thus positive adherence and synchronous movement of the contact device with the driver are assured. The contact device comprises a resilient contact arm 34b (FIGURES 2 and 7) which extends angularly downwardly from the general plane of the body of the device and terminates in a plurality of contacts 34c. The contacts are arranged and adapted to brush along the exposed arcuate surface of element 30r under force applied through stressing of the spring comprised in arm 34b. Further, the contacts are formed so that in operating attitude they extend substantially perpendicularly away from the surface of element 30r, as indicated in FIGURE 7, and so their ends are planar and in full-face contact with the element. Thereby any wearing of the contacts will not result in a change of the area of contact between the element and contacts, and electrical contact-resistance will remain uniform during wearing away of the contacts.

During assembly of the rotor device onto the base-substrate unit, terminal stub S3 is forced into and partly through the central part of the multi-lobed or cruciform opening 34m (FIGURE 2) at the center of the contact device, resiliently bending upwardly the adjacent portions of the sheet of the contact device as indicated in FIGURE 3. Concurrently, legs 26m of the driver are brought down into contact with the free annular surface area 30f (FIGURE 2) of substrate 30 between the element 30r and the conductive coating 30w. As the cap 24 is pressed down so its lower annular rim surface comes into contact with the upper face of base 22 with driver head 26s entering aperture 24a of cap 24, the O-ring 38 is slightly compressed and flattened, whereby an effective seal is attained and whereby the legs 26m of the driver are held in contact with the free annular surface area 30f of the substrate. The upper end of stub S3 and the upwardly-deflected portions of the contact device are permitted to enter a recess or hole 26h (FIGURES 3 and 6) provided at the center of the bottom face of driver 26.

The active parts of the potentiometer are retained in operating position by the housing members, and the latter are joined to complete a sealed housing by bringing the lower edge of the skirt of cap 24 into firm contact with the upper surface of base 22 and bonding the two confronting surfaces together while the housing parts are clamped or otherwise pressed together. Bonding and sealing may be effected by subjecting the contacting surfaces to ultrasonic vibration of the intensity required to cause surface fusion of the two parts in the zone of contact, when the joined parts are thermoplastic, or by adhesive means when the parts are not readily fused.

To limit rotation of the rotor, and concurrent brushing movement of the contacts to the exposed surface of element 30r between the terminations at 30u and 30v, a stop 26v (FIGURES 2 through 6) is provided on driver 26, and a coactive stop abutment 24s (FIGURE 2) is provided on the interior of cap 24 of the housing. Thus in rotation of the driver and contact device in one direction one face of stop 26v comes into arresting contact with a first face of abutment 24s, and in the opposite direction the other, opposite, faces similarly come into arresting engagement. The stop and stop abutment are dimensioned to additively cover the angular measure of the arc segment separating the adjacent ends of element 30r.

To insure proper positioning of the base 22 and the element 30r relative to the stop 24s, an inwardly-extending key 24k (FIGURE 2) is provided on the inside lower skirt of housing cap 24, which key is dimensioned to fit between the terminal stubs S1 and S2 in the notch 30n of substrate 30. In FIGURE 2, cap 24 has been rotated 180° about its axis from the position in which key 24k is adapted to enter between and be positioned by the stubs S1 and S2.

To facilitate manual manipulation of the rotor device, driver 26 is provided with a tool-slot 26g (FIGURE 4) to receive the bit of a tool such as a screwdriver.

It is made evident by the foregoing that during use of the potentiometer the contacts 34c (FIGURE 7) are subject to abrasive wear as they brush upon the resistance element comprised in member 30r, but that extensive wearing of the contacts may be accommodated without change of area of contact between the element and the contacts, due to the latter being of constant cross section and having their end portions disposed substantially perpendicular to the surface of the element. Additionally, and of considerable advantage, contact pressure is not only maintained substantially uniform during the lifetime of the potentiometer by the concurrent wearing of the contacts 34c and of legs 26m of the rotor member 26, but also, due to the engagement of legs 26m with the upper surface of substrate 30, the separation of the body of contact device 34 from the surface of substrate 30 and element 30r is affected substantially by manufacturing dimensional tolerances of only one part, whereby greatly improved uniformity among individual potentiometers of a lot or group being manufactured is attained.

Also it is made evident that due to the central portion of the multi-lobed aperture 34m in the contact device being of less minimum diametral dimension than the diameter of stub S3 of the third terminal member, the latter causes upward resilient deflection or distortion of the resilient inter-lobe leaves of the contact device, whereby the stub S3 is firmly but resiliently contacted and brushed by the inter-lobe leaves of the contact device, assuring excellent electrical communication between the contact device and the terminal member P3 while the latter at stub S3 concurrently serves as a lower pivot or bearing for the rotor structure.

It further is made evident that assembly of the substrate 30 to the base 22 as by heating and/or setting of an adhesive bonding material interposed as a pre-form or otherwise applied to one or both of the mating members facilitates machine-assembly of the resistor and provides an excellent guide for positioning of the rim of the skirt of shell or cap 24 of the housing onto the periphery of base 22 after the rotor structure has been assembled with the O-ring in the cap. Further, the construction and arrangement of the juncture between the cap or shell and the base, at the peripheries of those members, facilitate ultrasonic fusion bonding of the two housing members into an integral housing.

Further, as is evident, the arrangement of the terminal members or pins, P1, P2 and P3, whereby each is offset within the base 22, greatly reinforces the potentiometer against damage or derangement incident to plugging into or removal from a circuit board, while concurrently properly spacing the depending portions of the terminal pins for conformity with the standard spacing of apertures in circuit boards, and properly spacing the stubs S1 and S2 for electrical connection to members 30u and 30v and for locking-action with key 24k to insure precise positioning of stop abutment 24s of the housing relative to resistance element 30r and stop 26v of the rotor device.

As is further made evident, the contact pressure in the described potentiometer is independent of the force exerted by the compressed O-ring seal, any excess of the latter force being absorbed by legs 26m bearing on substrate surface 30f. As a consequence, variations in dimension, elasticity, age and material of the O-ring have no effect on the contact pressure, the latter being determined only by the sectional area of the contacts and the tension in spring arm 34b.

Thus each of the terminal members performs a plurality of functions as noted, as well as greatly facilitating machine assembly of the potentiometer. The latter, due to the single dimensional tolerance feature and to the uniform contact spacing and contact spring tension from instrument to instrument, and due to uniform contact resistance, is electrically, mechanically and operationally superior to other potentiometers of the small single-turn class while being relatively inexpensive to manufacture.

The preceding description makes it evident that the mentioned objects of the invention have been fully attained. In the light of the disclosure changes and modifications within the true spirit and scope of the invention will occur to others, and accordingly it is not desired that the scope of the invention be restricted except as is required by the appended claims.

I claim:

1. A very small single-turn potentiometer adapted to be plugged into perforate circuit boards, comprising:

housing means, including a generally circular base of insulation and three terminal members embedded in and extending through the base and terminating thereabove, said housing means further including a generally circular hollow shell secured at a peripheral zone to said base and forming therewith a chamber, said shell having an aperture in the top thereof;

a ceramic plate secured to the upper surface of said base, said plate bearing an arcuate resistance element device and terminal connections from respective ends thereof to respective ones of first and second ones of said terminal members; and a rotor device, including an insulation rotor member having a portion rotatable in said aperture of said shell and said rotor member having secured thereto a thin resilient contact device having a spring contact arm with contacts bearing on said resistive device and having a multi-lobed central aperture, the third of said terminal members having an upper portion protruding into said central aperture of said contact device and resiliently contacting the latter between the lobes of said aperture whereby effective electrical contact is maintained therebetween and whereby said third of said terminal members serves as a pivot on which said contact device is rotatable by rotation of said portion of said rotor member.

2. A potentiometer as defined in claim 1, in which said shell is bonded to said base by ultrasonic fusion.

3. A potentiometer as defined in claim 1, in which at least two of said terminal members comprise principal exposed pin portions extending outwardly from said housing and embedded offset portions in said base and stub portions extending from said base into said chamber.

4. A potentiometer as defined in claim 3, in which said ceramic plate is formed with an arcuate notch at its periphery, portions at and adjacent respective ends of the notch having a conductive adherent coating and the end walls defining ends of said notch closely engaging respective ones of said terminal members.

5. A potentiometer as defined in claim 1, in which said rotor member comprises a plurality of depending legs arranged for contact with the surface of said ceramic plate adjacent to said arcuate resistance element device, whereby spacing between said contact device and said ceramic plate is substantially uniform and uniformity of contact arm spring force is attained.

6. A potentiometer as defined in claim 1, in which the third of said terminal members includes a stub portion protruding upwardly from said base and into the central opening of said contact device provided by said multi-lobed aperture and deforming upwardly the inter-lobe portions of said contact device whereby said stub is gripped by and between said portions to provide improved electrical contact therebetween and to provide a pivot for said contact device.

7. A potentiometer as defined in claim 1, in which said spring contact arm terminates in a plurality of contacts each disposed substantially perpendicular to said resistance element device and each of uniform cross sectional dimensions for a distance from said element device.

8. A potentiometer as defined in claim 7, in which said rotor member comprises a plurality of depending legs arranged for contact with the surface of said ceramic plate adjacent to said arcuate resistance element device, whereby spacing between said contact device and said ceramic plate is substantially uniform and uniformity of contact arm spring force is attained.

9. A potentiometer according to claim 8, in which at least two of said terminal members comprise principal exposed pin portions extending outwardly from said housing and respective offset portions embedded in said base and stub portions extending from said base into said chamber.

10. A potentiometer according to claim 9, in which said ceramic plate is formed with an arcuate notch at its periphery, portions at and adjacent respective ends of the notch having a conductive adherent coating and the end walls defining ends of said notch closely engaging respective ones of said stub portions of said terminal members.

11. A potentiometer according to claim 10, in which the third of said terminal members includes a stub portion protruding upwardly from said base and into the central opening of said contact device provided by said multi-lobed aperture and deforming upwardly the inter-lobe portions of said contact device whereby said stub is firmly contacted by said inter-lobe portions to provide improved electrical contact therebetween and whereby said stub portion of said third terminal member provides a pivot for said contact device.

References Cited

UNITED STATES PATENTS

| | | | |
|---|---|---|---|
| 2,467,497 | 4/1949 | Ramos | 338—175 X |
| 3,193,786 | 7/1965 | Moore et al. | 338—175 X |
| 3,201,737 | 8/1965 | Mathison | 338—174 |
| 3,208,024 | 9/1965 | Enos et al. | 338—174 X |
| 3,242,450 | 3/1966 | Bourns et al. | 338—174 |

FOREIGN PATENTS

| | | |
|---|---|---|
| 1,298,703 | 12/1962 | France. |
| 297,808 | 9/1963 | Netherlands. |

ROBERT K. SCHAEFER, *Primary Examiner.*

H. HOHAUSER, *Assistant Examiner.*